United States Patent [19]

Todd et al.

[11] Patent Number: 5,551,826

[45] Date of Patent: * Sep. 3, 1996

[54] SKID STEER LOADER CAB MOUNTING APPARATUS

[75] Inventors: Robert R. Todd, Leola; Dale A. Ashcroft, New Holland, both of Pa.

[73] Assignee: New Holland North America, Inc., New Holland, Pa.

[ * ] Notice: The portion of the term of this patent subsequent to Aug. 24, 2014, has been disclaimed.

[21] Appl. No.: 419,475

[22] Filed: Apr. 10, 1995

[51] Int. Cl.$^6$ ........................................ E02F 3/00
[52] U.S. Cl. ................... 414/685; 180/89.14; 296/35.1; 296/190
[58] Field of Search ..................... 414/685; 296/35.1, 296/190; 180/89.14, 89.15, 89.16

[56] References Cited

U.S. PATENT DOCUMENTS

| | | | |
|---|---|---|---|
| 3,051,259 | 8/1962 | Lorenz | 180/89.14 |
| 3,215,292 | 11/1965 | Hall. | |
| 3,903,978 | 6/1975 | Kraus | 180/6.48 |
| 3,990,737 | 11/1976 | Palmer | 296/35.1 |
| 3,995,761 | 12/1976 | Hurlburt | 214/776 |
| 4,014,588 | 3/1977 | Kohriyama | 296/35.1 |
| 4,150,474 | 4/1979 | Bauer et al. | 29/463 |
| 4,355,946 | 10/1982 | Wykhuis et al. | 414/708 |
| 4,892,155 | 1/1990 | Wansmaker | 172/199 |

*Primary Examiner*—Donald W. Underwood
*Attorney, Agent, or Firm*—Frank A. Seemar; Larry W. Miller

[57] ABSTRACT

A skid steer loader having a main frame including a compartment in which an engine, hydraulic drive components and other elements are contained. A cab is mounted above the compartment on the main frame with load bearing side walls extending upwardly to define an operator control area therebetween. Pivotally mounted on such walls is a boom structure including a pair of arms and a mounting assembly. An engine is operatively associated with the boom structure for raising and lowering each of the pair of arms along a generally vertical path adjacent a corresponding load bearing side wall to which it is coupled by the mounting assembly. A unique noise isolation mounting arrangement is used to couple the cab structure to the main frame, on which cab the entire boom structure is mounted.

7 Claims, 6 Drawing Sheets

SKID STEER LOADER CAB MOUNTING APPARATUS

FIELD OF THE INVENTION

The present invention relates generally to front end loaders and more particularly to a skid steer loader having a cab from which engine and transmission noise is isolated.

BACKGROUND OF THE INVENTION

Over the years skid steer loaders have been known as agile, compact vehicles with a high degree of maneuverability and a wide range of applications in the agricultural, industrial and construction fields. These vehicles usually include an engine, a boom assembly and an operator compartment mounted on a frame supported by four ground engaging wheels. Coupled to the engine are a main drive system and a lift system for the boom assembly. The vehicle is maneuvered by driving the wheels on one side at a different speed and/or in a different direction from those on the other side resulting in a turning motion, the severity of which is determined by the relative speeds.

Typically the engine, which is rear mounted for counterbalancing effect, drives a pair of hydrostatic pumps coupled to left and right mounted hydrostatic motors. Wheels on the left and right sides of the vehicle are driven by the left and right mounted motors through gears, chains and sprockets. Motion is usually controlled by an operator seated within the operator compartment by actuating a pair of control levers which are linked to the pumps. The extent to which each lever is moved in a forward direction from a neutral position controls the amount of fluid supplied in a forward direction to its respective motor, and therefore the speed at which the wheels on that side of the vehicle will rotate. Similarly, the extent to which a lever is moved in the reverse direction from the neutral position will control the speed at which the associated wheels rotate in the reverse direction.

As mentioned above, skid steer loaders include a boom assembly, which consists of a pair of lift arms pivotally mounted on the main frame or a support frame extending upwardly from the main frame as shown in U.S. Pat. No. 3,903,978, issued Sep. 9, 1975 in the name of Peter B. Kraus. Material handling attachments, such as the bucket 18 shown in this patent, are usually mounted on the front of the lift arms. U.S. Pat. No. 4,892,155, issued Jan. 9, 1990 in the name of Richard B. Wanamaker, is also representative of skid steer loader type vehicles having lift arms supported on the main frame.

Another well known arrangement found in vehicles of this type comprises a pair of lift arms coupled to the frame by means of a linkage assembly, as best illustrated by U.S. Pat. No. 3,215,292, issued Nov. 11, 1965 in the name of Lawrence M. Halls. This linkage arrangement enhances the path of the bucket by moving it outwardly from vertical as it rises. Similar skid steer loader linkage systems are disclosed in U.S. Pat. Nos. 3,995,761, issued Dec. 7, 1976 in the name of Joseph C. Hurlburt and No. 4,355,946, issued Oct. 26, 1982 in the name of Lloyd A. Wykhuis, et al.

In a recent improved loader mechanism in which the boom assembly utilizes a linkage system similar to those referenced above, the lift arms are supported by the vertical walls of the cab. Exemplary of an assembly of this nature is the skid steer loader boom assembly shown in U.S. patent application Ser. No. 08/293,945, filed on Aug. 24, 1994 in the name of Dale A. Ashcroft, et al, and assigned to a common assignor.

A separate hydraulic system is usually used in skid steer loaders to power the boom assembly via hydraulic lift cylinders coupled to the lift arms. This same system can also be used to actuate one or two tilt cylinders which pivot the attachment relative to the lift arms, which is commonly referred to as dumping or curling the attachment. A pair of foot pedals in the front of the operator compartment control the flow of hydraulic fluid from a hydraulic pump to the lift and tilt cylinders.

In addition to material handling buckets, various other attachments, such as snow blowers, trenchers, tree spades and augers, which may include their own hydraulic motors and/or cylinders, are commonly mounted to the boom assembly. An auxiliary hydraulic system is used to control the flow of hydraulic fluid between a pump and the hydraulic motor of front mounted attachments. It is common in prior art systems for the flow of hydraulic fluid to the motor to be controlled by an auxiliary spool valve through actuation of a handle on one of the control levers. The handle is normally biased to a neutral position. Pushing the handle in one direction strokes the auxiliary valve in a first direction, thereby causing hydraulic fluid to flow in a first direction to such front mounted attachment. Pushing the handle in the opposite direction strokes the auxiliary valve to supply fluid in a reverse direction.

Of the wide range of attachments used in conjunction with skid steer loaders the most common is a material handling bucket mounted to pivot relative to the lift arms. The bucket is operational over its full lift path, e.g., it is positioned to receive a load while resting on or in the vicinity of the ground, after which it is pivoted upwardly and raised to an intermediate position for transport to a remote unloading area where it is unloaded by pivoting it downwardly to discharge its contents. Unloading may also take place at various elevated bucket positions relative to the loading or transport positions for discharging into the back of a dump truck, over the side of a manure spreader, etc.

A problem common to skid steer loaders is excessive noise encountered by the operator. Engine and hydraulic drives typically generate high levels of noise that travel to the operator via external as well as internal airborne paths. The noise also travels from the source to the operator via paths that are structure borne. In the past the structure borne paths that originate at the engine and transmission compartments have been interrupted by isolating the cab from vibrations of the main frame or chassis. For example, U.S. Pat. No. 4,150,474, issued Apr. 24, 1979 in the name of James J. Bauer, et al, shows in FIG. 12 a skid steer loader in which rubber cushions are mounted between the operator's compartment and the main frame of the vehicle.

There have also been attempts to reduce the affect of airborne noise by use of a cab in which the operator is enclosed by windows and doors to prevent airborne noise from entering the operator's work area. However, structure borne noise is still trapped in the enclosure and it can only be dealt with by use of ear protection which is less than desirable to an operator.

Applicants have learned that the boom structure in skid steer loaders is a significant noise transmission source for structure borne noise, under conditions where the boom is mounted to the chassis. Even when the cab is isolated (as mentioned above) this source of noise continues to be troublesome because the noise path is structurally coupled to the boom assembly which operates in paths adjacent to and in the vicinity to the operator.

Some government agencies and various European countries require that vehicles, such as skid steer loaders, must meet noise level standards that are difficult to achieve in a cost effective manner while still providing an "operator friendly" environment. For example, by installing doors and windows to interrupt external airborne noise the operator is inconvenienced by reducing flow of fresh air as well as the added task of opening and closing the door during each entrance and exit. Also, the use of ear protection devices to meet standards necessitates removal and storage each time the operator shuts down the machine, not to mention the added cost, discomfort, etc.

In all known prior art apparatus of which applicants are aware there is no skid steer loader cab mounting apparatus that provides for optimum noise isolation by isolating the cab and boom structure by common means.

SUMMARY OF THE INVENTION

An important object of the present invention is to provide skid steer loader cab mounting apparatus for isolating engine and transmission noise from the operator.

In pursuance of this and other important objects the present invention contemplates an improvement to a skid steer loader having a main frame including a compartment in which an engine and transmission components are contained, a cab mounted adjacent the compartment on the main frame having load bearing side walls extending upwardly from the main frame to define an operator control area therebetween, a boom structure including a pair of arms and a linkage assembly for operatively coupling the arms to the load bearing side walls, and power means comprising means for operatively associating the engine with the boom structure for raising and lowering each of the pair of arms along a path in a generally vertical plane adjacent its corresponding load bearing side wall. More particularly, the present invention contemplates means for mounting the cab together with the boom structure on the frame using resilient support means for isolating the frame from the cab and the boom structure. Isolating the cab and boom structure from the frame, and thus the compartment in the frame, interrupts the path of the noise transmitted via the frame from the engine and transmission contained in the compartment.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
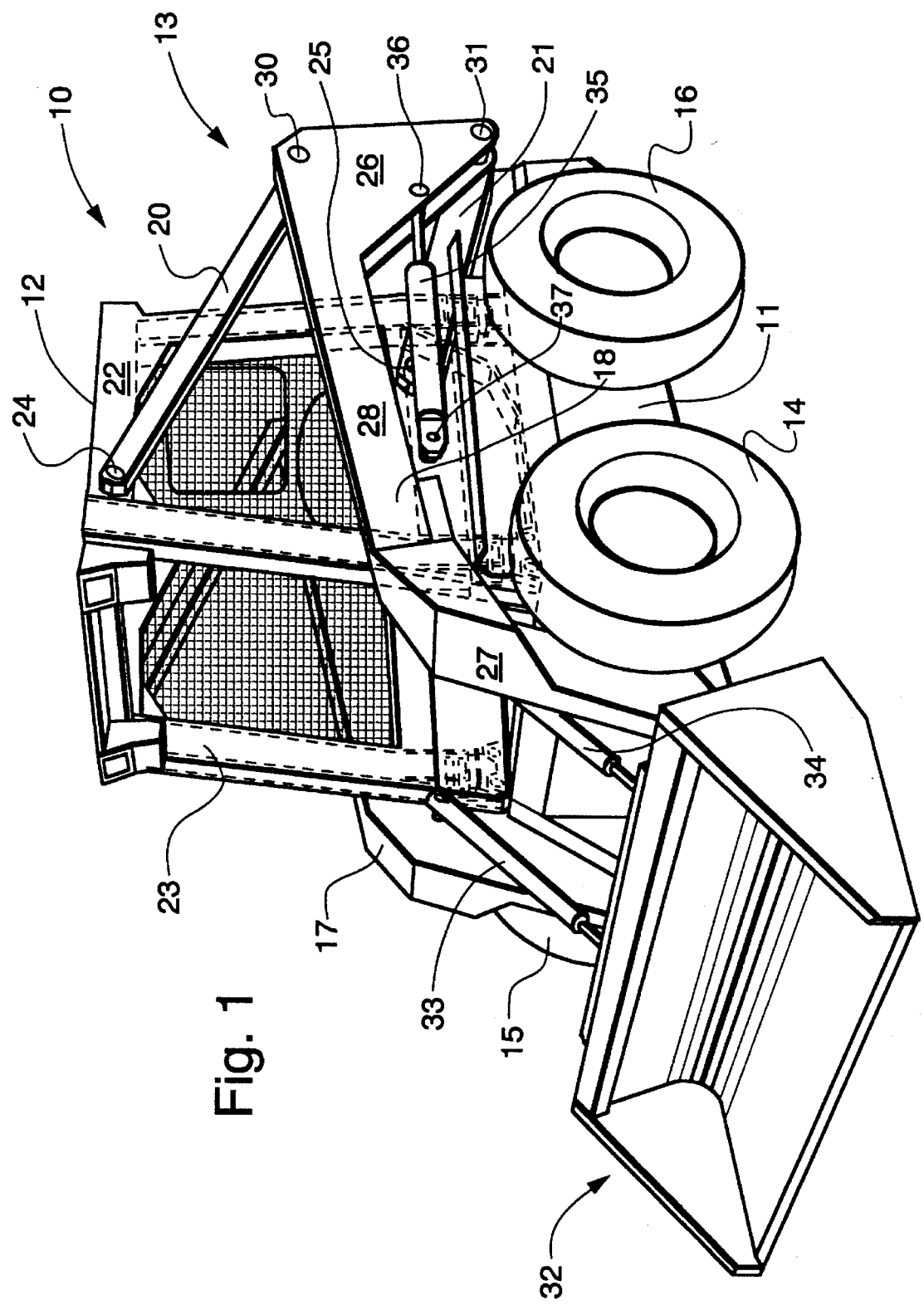
FIG. 1 is a perspective view of a skid steer loader in which the present invention is readily incorporated.

Referring now to the drawings for a more detailed description of the present invention, FIG. 1 shows a skid steer loader 10, which is readily adaptable to incorporate the preferred embodiment of the present invention. Loader 10, which utilizes a four bar linkage system of the type generally disclosed in U.S. Pat. No. 3,215,292, issued Nov. 2, 1965 in the name of L. M. Halls, hereby incorporated by reference, includes a main frame 11, a cab 12 and a boom assembly 13, all of which are supported by a pair of front wheels 14, 15 and a pair of rear wheels 16 (only one shown) mounted on axles (not shown) extending from main frame 11.

A pair of lift arms 17, 18 are swingably mounted via upper links 20 and lower links 21 to load supporting side walls 22, 23 of cab 12 via pivots 24 and 25, respectively. For convenience, because the elements on one side of skid steer loader 10 are paired with similar elements on the other side, only one side of the boom assembly mounting structure will be described in most instances in the following description. Each lift arm 17, 18 comprises a rear portion 26, a forward portion 27 and an intermediate integral portion 28, and accommodates upper link 20 and lower link 21 at pivots 30 and 31, respectively, in the rear portion 26 thereof.

Pivotally mounted to the forward portion 27 of lift arms 17, 18 is an attachment such as a material handling bucket 32 which is rotated with respect to the lift arms in a known manner by means of hydraulic tilt cylinders 33, 34. The entire boom assembly 13 and bucket 32 are raised and lowered by means of a pair of hydraulic cylinders 35, each of which is pivotally mounted to the rear portion 26 of lift arm 17 at a pivot 36 and side wall 22 at pivot 37.

Figure 2:
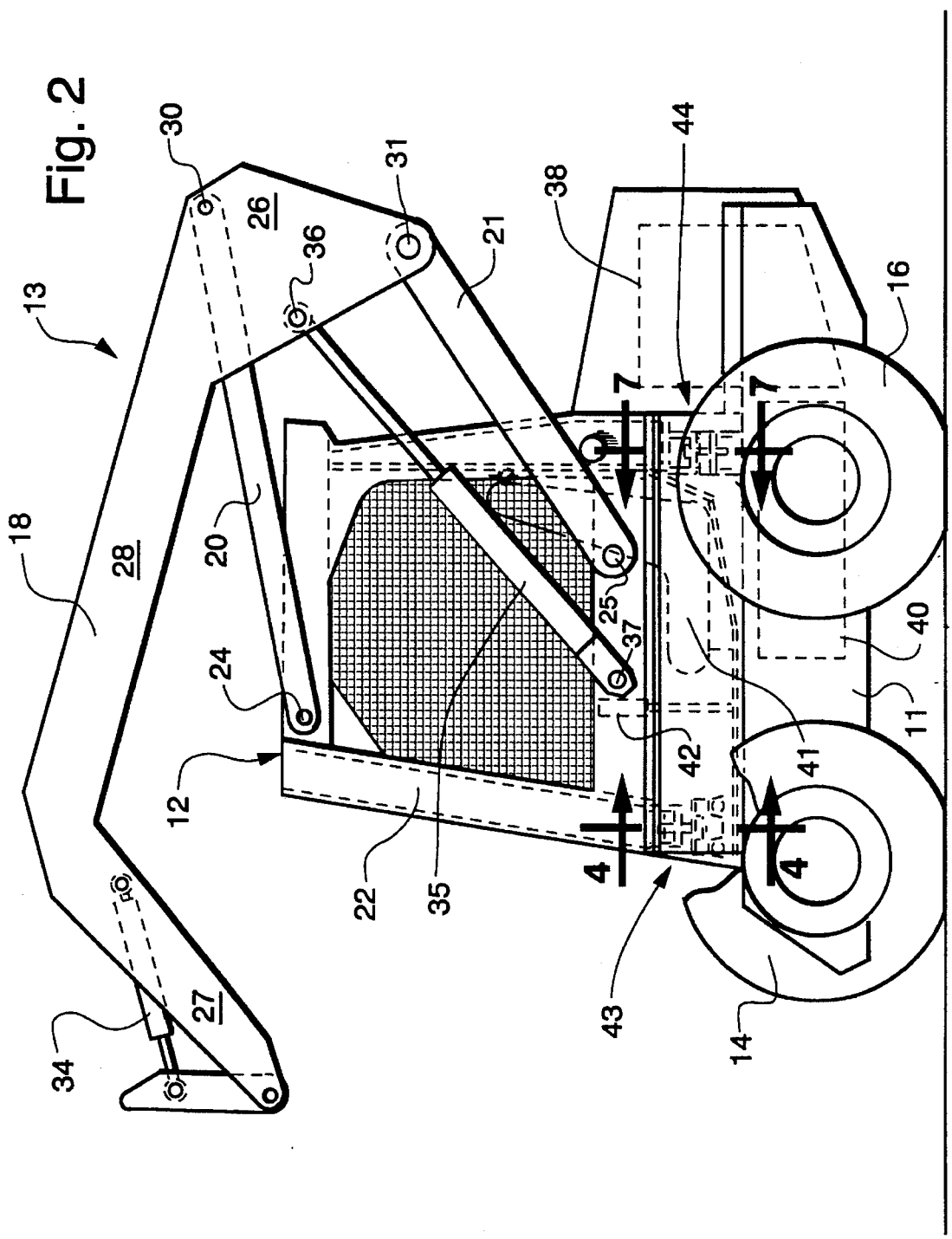
FIG. 2 is a side elevational view showing the relationship of the present invention to the loader of FIG. 1, shown with the boom raised and the bucket removed.

In FIG. 2 the loader described above is shown with the boom structure raised to an intermediate position and the material handling bucket 32 removed. An engine 38 is depicted by phantom outline to illustrate the common location for the engine within the vehicle main frame 11, i.e., generally rearwardly for counterbalancing purposes. A transmission 40 is also depicted by phantom outline to illustrate its common location within the loader main frame 11, which is a compartment defined by the main frame structure below the operator control area. Mounted within cab 12 is a seat 41 located for convenient access to the controls such as lever 42 which operates in a well known manner to initiate and carry out various functions of the loader. Pairs of front and rear coupling assemblies 43, 44, are used to mount cab 12 to main frame 11.

Figure 3:
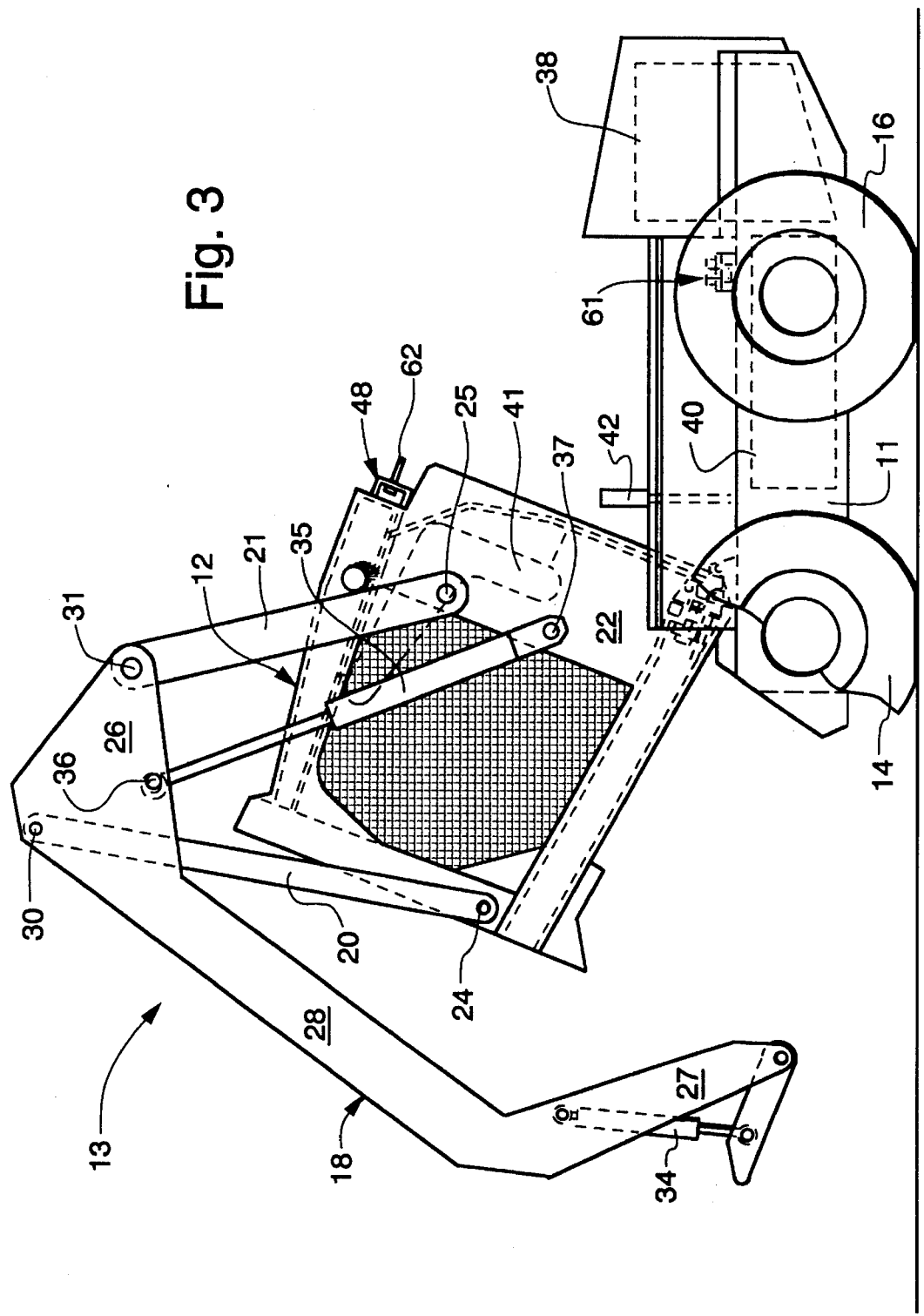
FIG. 3 is a side elevational view of the loader with the cab and boom tilted to a forward access position to clearly illustrate the present invention.
Figure 4:
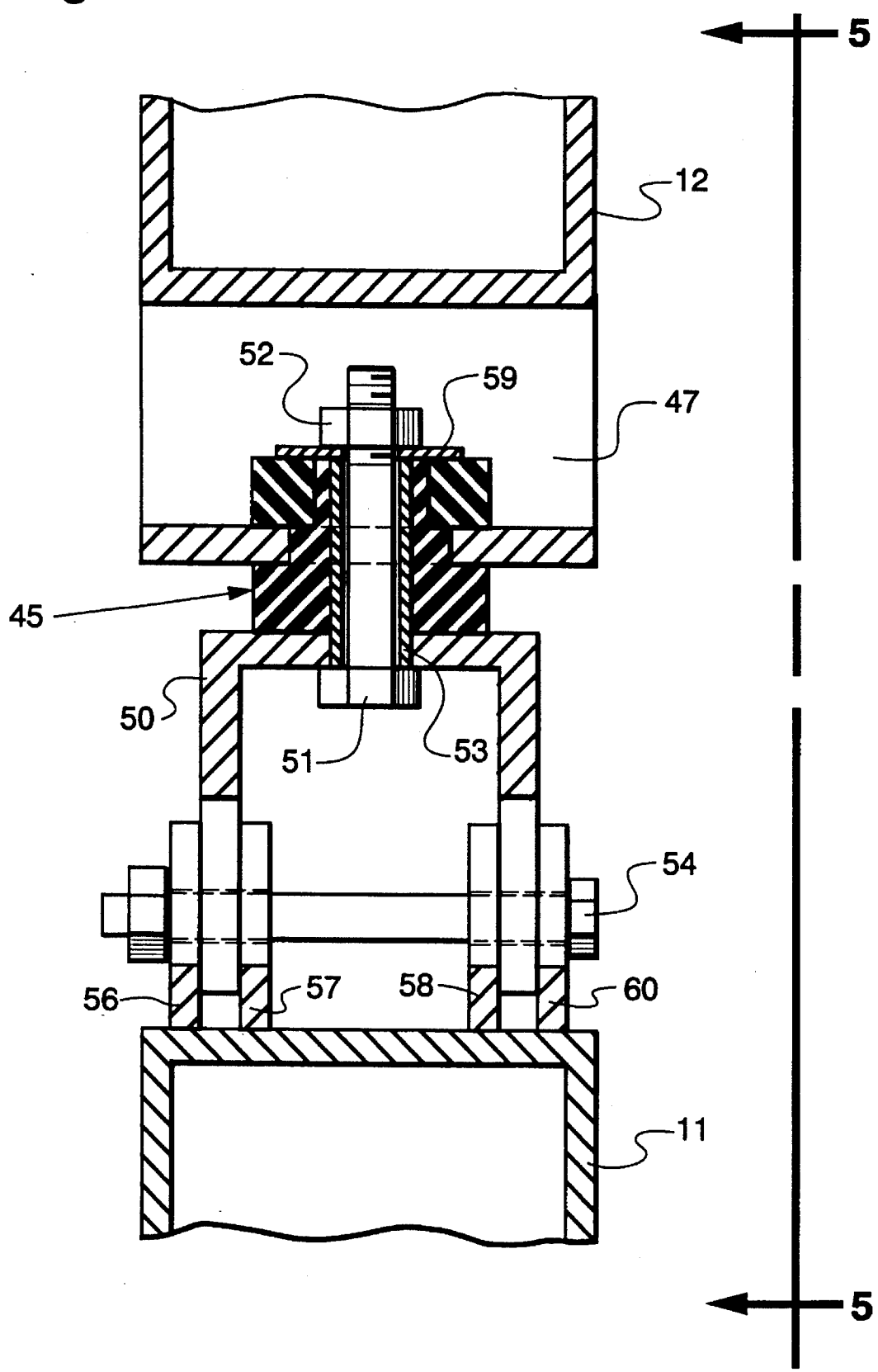
FIG. 4 is a view taken in the direction of arrows 4—4 in FIG. 2.
Figure 5:
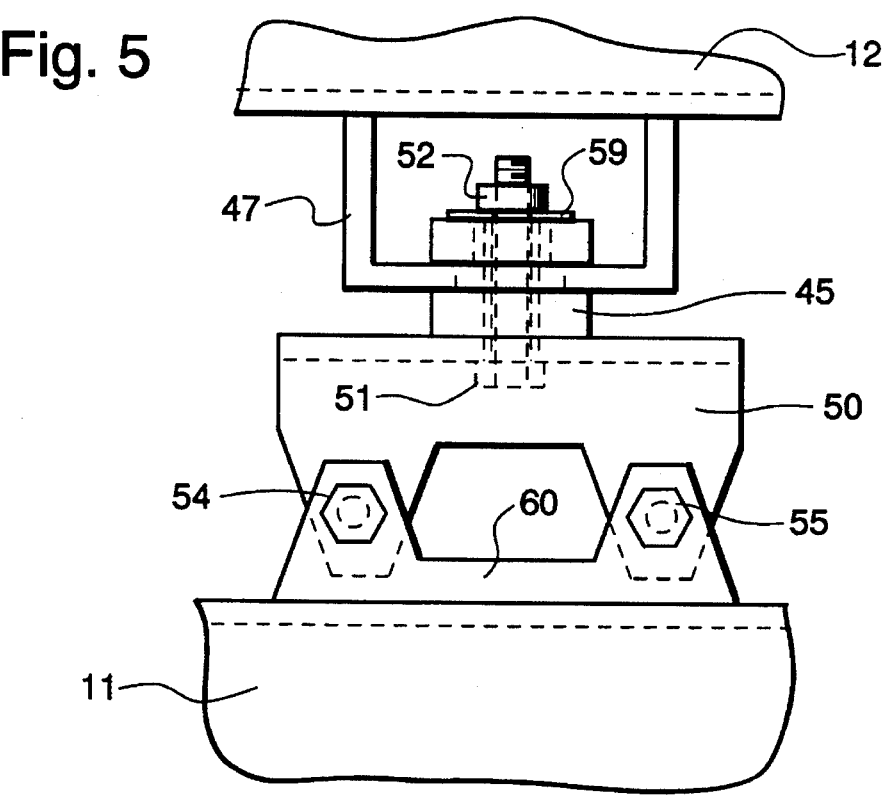
FIG. 5 is a view taken in the direction of arrows 5—5 in FIG. 4.

Coupling assemblies 43, 44 permit the cab and boom to be separated from the main frame in a pivotal manner, as shown in FIG. 3 for maintenance and service. More particularly, front coupling assemblies 43 have pivoted and fixed positions illustrated by the assemblies in FIGS. 6 and 5, respectively. FIG. 4, a sectional view through one of the front coupling assemblies in the fixed position shown in FIG. 5, shows details of the coupling components.

Figure 6:
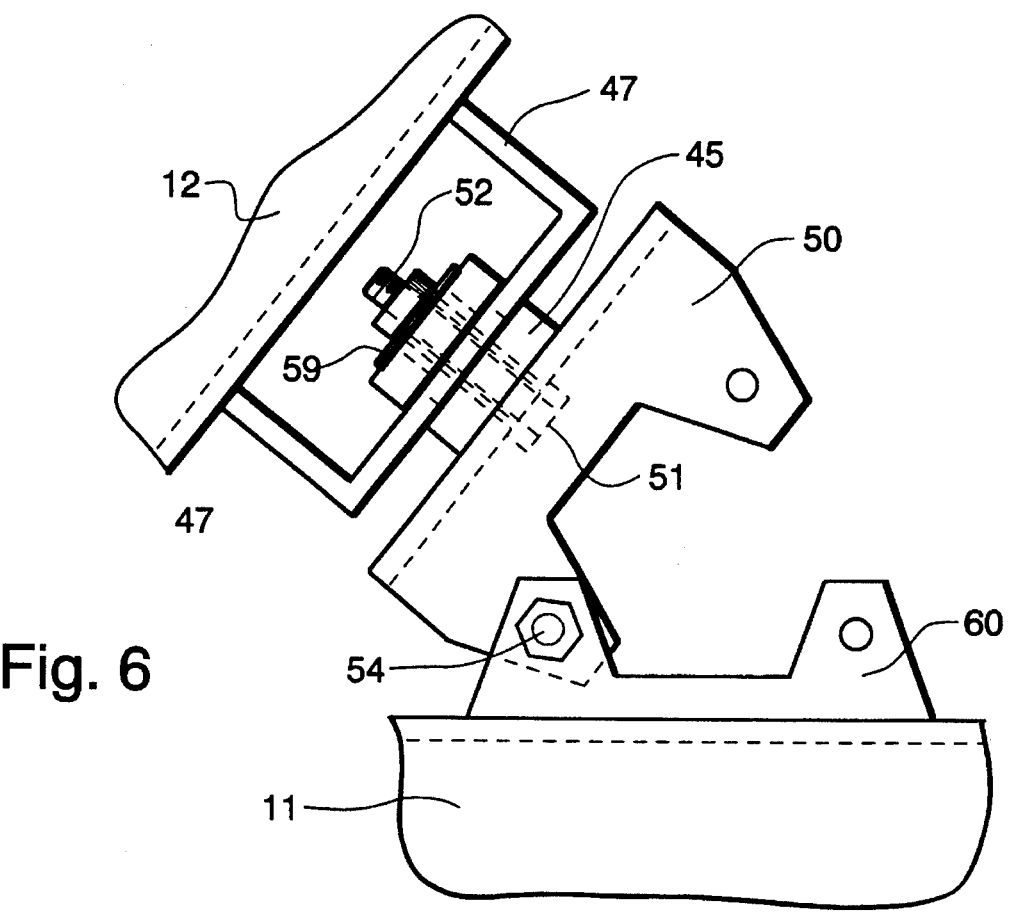
FIG. 6 is a view similar to FIG. 5 with the elements shown in the tilted position depicted in FIG. 3.
Figure 7:
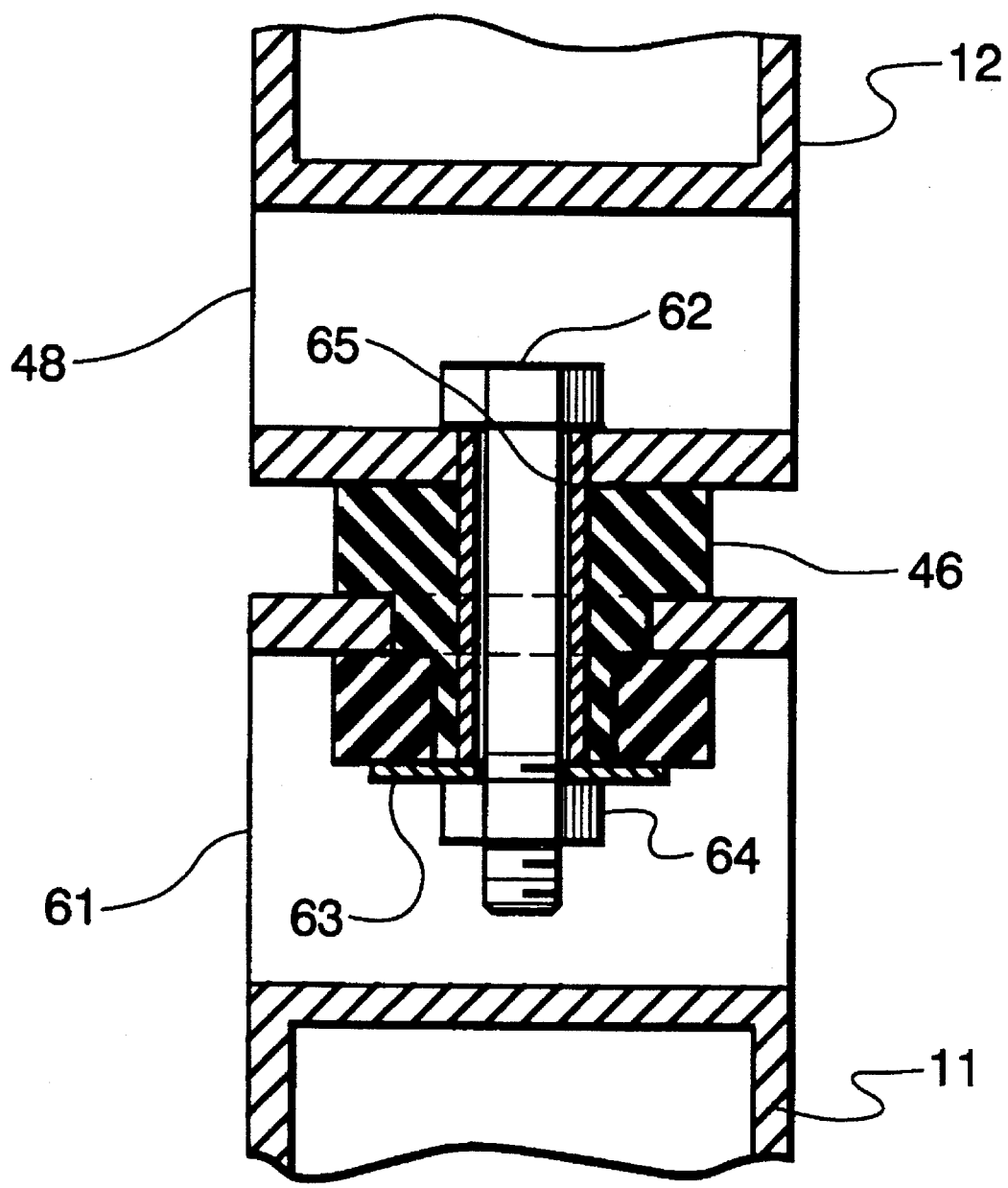
FIG. 7 is a view taken in the direction of arrows 7—7 in FIG. 2.

The present invention features a boom mounted on a cab both of which are isolated by coupling assemblies at the of which are front and rear resilient isolation elements 45 (FIGS. 4–6) and 46 (FIG. 7), affixed to cab 12 via front brackets 47 and rear brackets 48, respectively, intermediate cab 12 and main frame 11. As shown in FIG. 4, on one side of the front of the loader, isolation element 45 couples bracket 47 to a pivotal support member 50 via a securing bolt 51, washer 59 and nut 52 extending coaxial with sleeve 53. Pivotal support member 50 is attached to main frame 11 by a pair of mounting bolts 54, 55 journalled in four fixed support flange elements 56, 57, 58, 60 extending upwardly from main frame 11. By removing rearmost mounting bolts 55, cab 12 (along with boom assembly 13, mounted therewith) is pivotal about the remaining mounting bolt 51, as shown in FIGS. 3 and 6. An identical resilient isolation element is mounted on the opposite side of the loader.

In a similar manner rear isolation elements 46 couple brackets 48 to a fixed support member 61 (FIG. 7) but with no intermediate means as in the front assembly. Element 46 is secured in place via securing bolt 62, washer 63, nut 64 and sleeve element 65.

Elements 45, 46, consisting of two interfitting parts fabricated from elastomeric material such as Neoprene, are commercially available. For example, the Barry Controls Company, Brighton, Mass., markets a product with sufficient dimensions and performance characteristics under its 22000 Series.

Thus, of the many implicit and explicit advantages of the present invention one of the most important is the provision of a relatively cost effective solution to a problem in a simple non-obvious manner. Further, in view of the improved noise level in the operator control area there is inherently a resulting improvement in the productivity and efficiency of the unit. Even though the noise inherent in vehicles if this nature still exists, applicants have successfully isolated it by interrupting its structural path to the area in the vicinity of the operator. Accordingly, the noise that does find its way to the operator is airborne and more readily dealt with by shielding disposed in its direct path, such as side and rear windows, if necessary.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. In a skid steer loader comprising
    a main frame including a compartment in which an engine and transmission components are contained, both of which generate high levels of noise,
    a cab,
    means for mounting said cab adjacent said compartment on said main frame,
    said cab including load bearing side walls extending upwardly from said main frame to define an operator control area therebetween,
    a boom structure mounted on said load bearing side walls, said boom structure comprising a pair of arms and a linkage assembly for operatively coupling said pair of arms to said side walls, and
    power means comprising means for operatively associating said engine with said boom structure for raising and lowering each of said pair of arms along a generally vertical path adjacent its corresponding load bearing side wall to which it is coupled, the improvement comprising
    resilient support means for isolating said frame from said cab and said boom structure whereby said cab and said boom structure are isolated from said compartment to thereby interrupt the path of the noise transmitted through the frame from the engine and transmission contained in said compartment.

2. In a skid steer loader as set forth in claim 1 wherein said resilient support means comprise an elastomeric material.

3. In a skid steer loader as set forth in claim 2 wherein said power means include
    a pair of hydraulic cylinders connected between said cab and said respective arms, and
    a hydraulic system for providing fluid flow to said cylinders for raising and lowering said arms along said paths adjacent said operator control area without structurally transmitting noise from said compartment to said operator area.

4. In a skid steer loader as set forth in claim 2 wherein said linkage assembly comprises a pair of upper links and a pair of lower links, each of which is connected, respectively, between one of said load bearing side walls of said cab and one of said arms for supporting said arms as they are guided along said paths without structurally transmitting noise from said compartment to said operator area.

5. In a skid steer loader as set forth in claim 4 wherein said upper links are pivotally connected to the uppermost portion of said side walls, and
    said lower links are pivotally connected to the lowermost portion of said side walls.

6. In a skid steer loader as set forth in claim 4 wherein said power means include a pair of hydraulic cylinders connected between said cab and said respective arms, and
    a hydraulic system for providing fluid flow to said cylinders for raising and lowering said arms along said paths adjacent said operator control area without structurally transmitting noise from said compartment to said operator area.

7. In a skid steer loader as set forth in claim 6 wherein said upper links are pivotally connected to the uppermost portion of said side walls, and
    said lower links are pivotally connected to the lowermost portion of said side walls.

* * * * *